United States Patent
Kumar et al.

(10) Patent No.: US 10,724,879 B2
(45) Date of Patent: Jul. 28, 2020

(54) FLOW MEASURING DEVICE OPERATING ON THE VORTEX COUNTER PRINCIPLE

(71) Applicant: Endress + Hauser Flowtec AG, Reinach (CH)

(72) Inventors: Vivek Kumar, Allschwil (CH); Marc Hollmach, Basel (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 271 days.

(21) Appl. No.: 15/745,194

(22) PCT Filed: Jun. 22, 2016

(86) PCT No.: PCT/EP2016/064372
§ 371 (c)(1),
(2) Date: Jan. 16, 2018

(87) PCT Pub. No.: WO2017/012811
PCT Pub. Date: Jan. 26, 2017

(65) Prior Publication Data
US 2019/0011297 A1     Jan. 10, 2019

(30) Foreign Application Priority Data
Jul. 17, 2015   (DE) .................. 10 2015 111 642

(51) Int. Cl.
*G01F 1/32* (2006.01)
*G01F 1/36* (2006.01)
*G01F 1/40* (2006.01)

(52) U.S. Cl.
CPC .......... *G01F 1/3209* (2013.01); *G01F 1/3254* (2013.01); *G01F 1/36* (2013.01); *G01F 1/40* (2013.01)

(58) Field of Classification Search
CPC . G01F 1/3209; G01F 1/40; G01F 1/36; G01F 1/3254
See application file for complete search history.

(56) References Cited

U.S. PATENT DOCUMENTS 3,719,073 A    9/1970   Mahon
4,048,854 A    9/1977   Herzl
(Continued)

FOREIGN PATENT DOCUMENTS

CN    1692273 A    11/2005
CN    102348958 A    2/2012
(Continued)

OTHER PUBLICATIONS

A. Venugopal, Amit Agrawal, S.V. Prabhu—Performance evaluation of piezoelectric and differential pressure sensor for vortex flowmeters—Published Dec. 27, 2013 in "Measurement" by Elsevier, 50th edition, pp. 10-18 (Year: 2013).*
(Continued)

*Primary Examiner* — Peter J Macchiarolo
*Assistant Examiner* — John M Royston
(74) *Attorney, Agent, or Firm* — Bacon & Thomas, PLLC

(57) ABSTRACT

A flow measuring device operating on the vortex counter principle, comprises: a measuring tube; a blockage in the form of a bluff body in the measuring tube for bringing about a Karman vortex street with flow dependent vortex frequency; a first pressure fluctuation measuring arrangement for registering vortex related pressure fluctuations and for providing signals dependent on pressure fluctuations; a second pressure fluctuation measuring arrangement for registering vortex related pressure fluctuations and for providing signals dependent on pressure fluctuations. The first pressure fluctuation measuring arrangement is spaced in the longitudinal direction of the measuring tube from the second
(Continued)

pressure fluctuation measuring arrangement. An evaluating unit for determining a vortex frequency and a flow measured value dependent thereon, and the evaluation unit is further adapted, based on the ratio of the amplitudes of the signals of the first pressure fluctuation measuring arrangement and the second pressure fluctuation measuring arrangement, or variables derived therefrom, to determine the current Reynolds number and/or the kinematic viscosity of the medium flowing in the measuring tube.

9 Claims, 3 Drawing Sheets

(56) References Cited

U.S. PATENT DOCUMENTS

| | | | |
|---|---|---|---|
| 4,754,649 | A | 7/1988 | Lew |
| 5,429,001 | A | 7/1995 | Kleven |
| 2004/0244499 | A1* | 12/2004 | Keita ................. G01F 1/3209 73/861.22 |
| 2009/0211368 | A1 | 8/2009 | Garnett et al. |
| 2011/0314929 | A1* | 12/2011 | Limacher ............. G01F 1/3209 73/861.04 |

FOREIGN PATENT DOCUMENTS

| | | |
|---|---|---|
| DE | 69206108 T2 | 4/1996 |
| DE | 10240189 A1 | 3/2004 |
| DE | 10321003 A1 | 12/2004 |
| DE | 69922663 T2 | 10/2005 |
| DE | 10295690 B4 | 5/2014 |
| DE | 102015111642 A1 | 1/2017 |
| EP | 0619473 A1 | 10/1994 |
| WO | WO0008420 A1 | 2/2000 |
| WO | WO2004001343 A2 | 12/2003 |

OTHER PUBLICATIONS

Office Action dated Jun. 13, 2019 issued in corresponding Chinese application No. 2016 80040922.2.
German Search Report, German Patent Office, Munich, DE dated Feb. 24, 2016.
International Search Report, EPO, The Netherlands, dated Jun. 22, 2016.
English Translation of the International Preliminary Report on Patentability, WIPO, Geneva, CH, dated Feb. 1, 2018.

* cited by examiner

FLOW MEASURING DEVICE OPERATING ON THE VORTEX COUNTER PRINCIPLE

TECHNICAL FIELD

The present invention relates to a flow measuring device operating on the vortex counter principle, as described, for example, in the Durchfluss-Handbuch (Flow Handbook), 4th Edition 2003, ISBN 3-9520220-3-9, pgs. 103 ff.

BACKGROUND DISCUSSION

Such flow measuring devices operate on the basis that vortices are shed alternately from both sides of a blockage, around which a fluid is flowing in a pipeline, such that a so called Karman vortex street forms, wherein the vortices lead to periodic pressure fluctuations, which are registered with pressure sensors or a paddle. The shedding frequency of the vortices for a particular measuring arrangement is proportional to the flow velocity and to the Strouhal number, a dimensionless number, which has a weak dependence on the Reynolds number. For wide ranges of Reynolds numbers, the Strouhal number can to a first approximation be assumed to be constant. Especially for Reynolds numbers under 20000, however, this no longer holds, so that the model ascertaining the flow based on the vortex frequency must be refined.

An approach to this is described in European Patent, EP 0 619 473 A1, according to which the pressure fluctuations are registered with two paddles spaced differently far from the blockage. The phase difference between the registered pressure fluctuations is then taken into consideration for correcting the flow measurement. The phase difference has, however, large fluctuations, so that the signal processing for ascertaining it is very complex. This is true especially when a compact flow measuring device is desired, in the case of which the locations for registering the pressure fluctuations are arranged near the blockage and not spaced far from one another.

SUMMARY OF THE INVENTION

It is, therefore, an object of the present invention to provide a flow measuring device operating on the vortex counter principle and a measuring method, which overcome the disadvantages of the state of the art. The object is achieved according to the invention by the flow measuring device as defined in independent patent claim 1 and the method.

The flow measuring device of the invention operating on the vortex counter principle includes a measuring tube; a blockage in the form of a bluff body, which is arranged in the measuring tube, wherein the bluff body serves to bring about a Karman vortex street with a flow dependent vortex frequency, when a fluid is flowing through the measuring tube; a first pressure fluctuation measuring arrangement for registering pressure fluctuations brought about by the vortex street and for providing signals dependent on pressure fluctuations; a second pressure measuring arrangement for registering pressure fluctuations brought about by the vortex street and for providing signals dependent on pressure fluctuations; wherein the first pressure fluctuation measuring arrangement is spaced in the longitudinal direction of the measuring tube from the second pressure fluctuation measuring arrangement; an evaluating unit, which is adapted, based on the signals of at least one of the pressure fluctuation measuring arrangements, to determine a vortex frequency and as a function of vortex frequency a measured value of flow; wherein, according to the invention, the evaluation unit is further adapted, based on the ratio of the amplitudes of the signals of the first pressure fluctuation measuring arrangement and the second pressure fluctuation measuring arrangement, or variables derived therefrom, to determine the current Reynolds number and/or the kinematic viscosity of the medium flowing in the measuring tube.

In a further development of the invention, the evaluating unit is adapted to determine the measured value of flow taking into consideration the ascertained Reynolds number.

In a further development of the invention, at least one of the pressure fluctuation measuring arrangements includes a paddle sensor, thus a sensor, which has a paddle, which protrudes inwardly into the measuring tube, wherein periodic pressure differences arise on the two sides of the paddle from the pressure fluctuations in the medium, so that the paddle is deflected. In a further development of the invention, at least one of the pressure fluctuation measuring arrangements includes at least one pressure tap in a measuring tube wall and/or in the bluff body.

In a further development of the invention, at least one of the pressure fluctuation measuring arrangements includes a first pressure difference measuring arrangement, with a first pressure tap and a second pressure tap, for registering pressure differences, which are brought about by the vortex street, and for providing pressure difference dependent signals.

In a further development of the invention, the second pressure fluctuation measuring arrangement includes a third pressure tap and a fourth pressure tap for registering pressure differences, which are brought about by the vortex street, and for providing pressure difference dependent signals.

In a further development of the invention, at least one of the pressure fluctuation measuring arrangements includes a pressure tap and a pressure difference sensor with a first pressure input and a second pressure input, wherein the second pressure input has a throttle, so that it has another frequency dependent transfer function for pressure fluctuations than the first pressure input, wherein the first pressure input and the second pressure input are connected to the pressure tap, so that the signal of the pressure difference sensor depends essentially on the time rate of change of the pressure (dp/dt).

In a further development of the invention, the bluff body has perpendicular to the longitudinal direction a width b, wherein the first pressure fluctuation measuring arrangement is spaced in the longitudinal direction of the measuring tube not less than one width b, especially not less than two widths b, preferably not less than 3 widths b, from the second pressure fluctuation measuring arrangement.

The method of the invention serves for determining at least one physical parameter of a fluid by means of a flow measuring devices operating according to the vortex counter principle, wherein the flow measuring device includes: a measuring tube for conveying a fluid in the longitudinal direction of the measuring tube; a blockage in the form of a bluff body, which is arranged in the measuring tube, wherein the bluff body serves to bring about a Karman vortex street with a flow dependent vortex frequency, when a fluid is flowing through the measuring tube; a first pressure fluctuation measuring arrangement for registering pressure fluctuations brought about by the vortex street and for providing signals dependent on pressure fluctuations; a second pressure measuring arrangement for registering pressure fluctuations brought about by the vortex street and for providing signals dependent on pressure fluctuations; wherein the first pressure fluctuation measuring arrangement is spaced in the longitudinal direction of the measuring tube from the second pressure fluctuation measuring arrangement; wherein the method comprises steps as follows: permitting a fluid to flow through the measuring tube; registering by means of the first pressure fluctuation measuring arrangement pressure fluctuations, which are brought about by the vortex street of the flowing fluid; registering by means of the second pressure fluctuation measuring arrangement pressure fluctuations, which are brought about by the vortex street of the flowing fluid; and determining a current value of the Reynolds number and/or of the kinematic viscosity of the fluid based on the ratio of the amplitudes of the signals of the first pressure fluctuation measuring arrangement and the second pressure fluctuation measuring arrangement, or variables derived therefrom.

In a further development of the invention, the method includes determining a value of the Reynolds number of the fluid based on the ratio of the amplitudes of the signals of the first pressure fluctuation measuring arrangement and the second pressure fluctuation measuring arrangement; determining a value of the frequency of at least one of the signals of the pressure fluctuation measuring arrangements; and determining a flow measured value as a function of the value of the frequency taking into consideration the value of the Reynolds number.

BRIEF DESCRIPTION OF THE DRAWINGS

The invention will now be explained in greater detail based on examples of embodiments illustrated in the drawing, the figures of which show as follows:

FIG. 3b is a measuring tube with positions of pressure fluctuations measuring arrangements leading to the amplitude ratios illustrated in FIG. 3a.

DETAILED DISCUSSION IN CONJUNCTION WITH THE DRAWINGS

Figure 1:
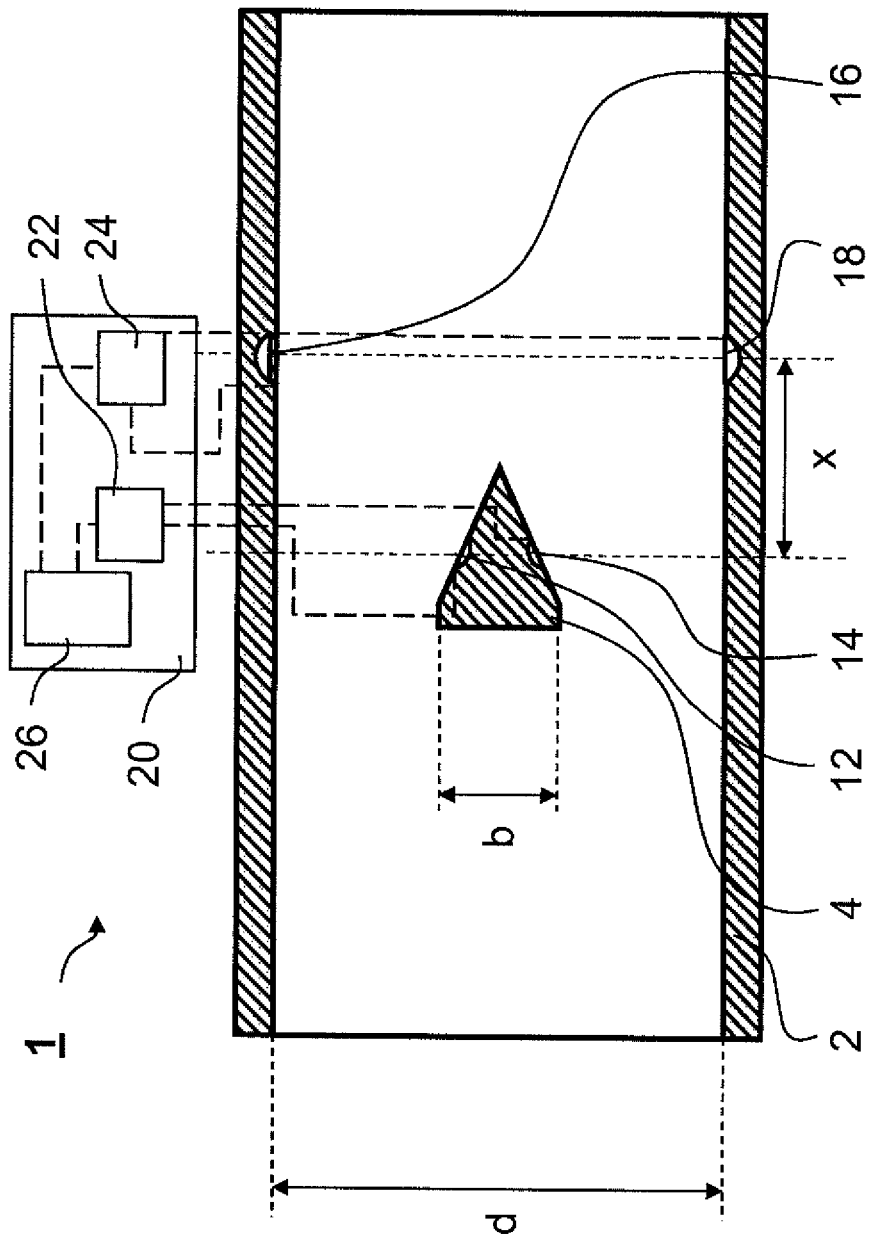
FIG. 1 is a schematic representation of a first example of an embodiment of a flow measuring device of the invention in a longitudinal section, which extends transversely to the bluff body.

The example of an embodiment of a flow measuring device 1 of the invention operating according to the vortex counter principle, as shown in FIG. 1, includes a measuring tube 2 having an inner diameter d, in which a bluff body 4 of width b is arranged extending especially symmetrically to a symmetry plane containing the longitudinal axis of the measuring tube. Bluff body 4 is connected at its two ends with the measuring tube 2. Bluff body 4 serves in measurement operation to bring about a Karman vortex street with flow dependent vortex frequency in a medium flowing in the measuring tube.

In order to register the vortex frequency, flow measuring devices of the field of the invention operating on the vortex counter principle have a pressure fluctuation measuring arrangement for registering pressure fluctuations caused by the vortex street. The flow measuring device 1 of the invention includes two such pressure fluctuation measuring arrangements, which have here, in each case, a pair of pressure sensors with a sufficiently fast measured value registering capability, in order to be able to register vortex frequencies of up to, for instance, 3 kHz. A first pressure fluctuation measuring arrangement includes a first pressure sensor 12 and a second pressure sensor 14, which are arranged on the bluff body symmetrically to one another relative to a tube central plane. A second pressure fluctuation measuring arrangement includes a third pressure sensor 16 and a fourth pressure sensor 18, which are arranged on the inner surface of the wall of the measuring tube symmetrically to one another relative to the aforementioned symmetry plane. The pressure sensors 16, 18 of the second pressure fluctuation measuring arrangement are arranged with a separation x in the flow direction from the pressure sensors 12, 14 of the first pressure fluctuation measuring arrangement. Separation x amounts to a multiple of the width b of the bluff body, wherein especially $1 < x/b < 10$. Pressure sensors with a sufficiently fast measured value registering capability are obtainable, for example, from the firm, Kulite.

The pressure sensors can, on the one hand, be absolute pressure- or relative pressure sensors, which measure the media pressure relative to vacuum and atmospheric pressure, respectively, or dynamic pressure sensors, which supply the media pressure to the two sides of a measuring membrane of the dynamic pressure sensor with different time constants, in order to effect that pressure fluctuations are directly registered. Insofar as in a pipeline also other pressure fluctuations can occur, which are superimposed on the pressure fluctuations of the Karman vortex street, it is provided, in each case, to take into consideration the difference of the signals of the two pressure sensors of a pressure fluctuation measuring arrangement for determining the vortex frequency. Fundamentally, the pressure fluctuation measuring arrangements can have, in each case, instead of two pressure sensors, a pressure difference sensor, which registers the difference between the pressures at two pressure sensing points arranged symmetrically to the aforementioned symmetry plane, wherein, for this, working pressure lines or hydraulic lines with as small as possible time constant are provided between the pressure sensing points and the pressure difference sensor.

The flow measuring device of the invention further includes an operating- and evaluating unit 20 for evaluating the signals of the pressure fluctuation measuring arrangements. Operating- and evaluating unit 20 can have, for example, first and second subtraction circuits 22, 24, which, in each case, form a difference signal from the signals of the pressure sensors of the first and second pressure fluctuation measuring arrangements, respectively. Operating- and evaluating unit 20 further includes a signal processor 26, which is connected to the outputs of the subtraction circuits and adapted to determine based on the time curve of at least one of the difference signals the shedding frequency f of the vortices. Furthermore, the signal processor is adapted to determine the amplitudes of the difference signals and to calculate therefrom an amplitude quotient of the amplitudes $A_2/A_1$ of the difference signals of the first and second pressure fluctuation measuring arrangements. Operating- and evaluating unit 20 is further adapted, based on the amplitude quotient, to ascertain a current value for the Reynolds number, on the basis of which the Strouhal number is determined, with whose help then, based on the shedding frequency f of the vortices, a flow velocity and/or a volume flow rate are calculated.

Figure 3C:
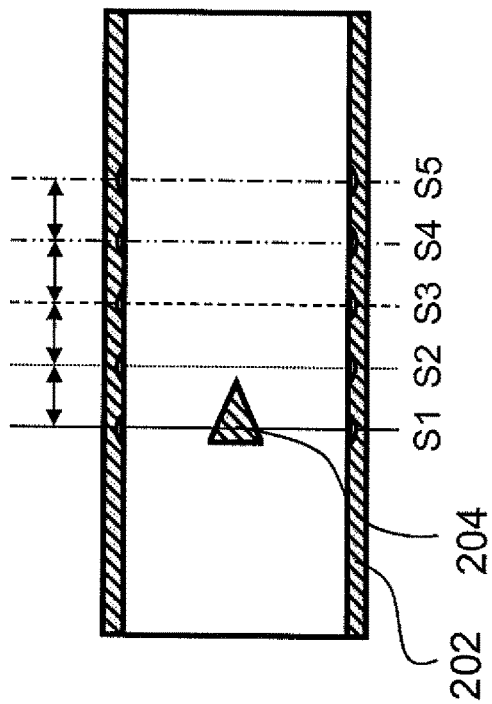
FIG. 3c: is the Strouhal number for flow measuring devices operating according to the vortex counter principle as a function of the Reynolds number.

Details for ascertaining the Strouhal number based on the amplitude ratio are explained below based on FIGS. 3a to 3c.

In the case of need, based on the volume flow rate Vdot and the Reynolds number Re, additionally the kinematic viscosity ν can be calculated according to $$\nu = (4V\text{dot})/(\pi Re\ d)$$

and output in addition to the measured value of flow as supplemental information, wherein d is the tube diameter.

Figure 2:
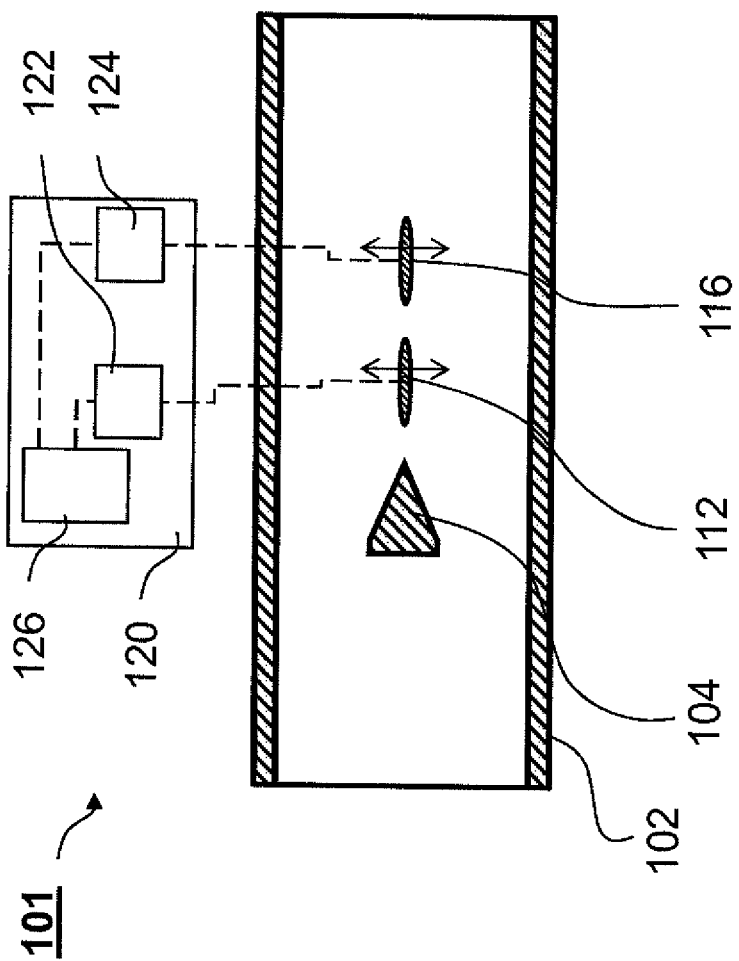
FIG. 2 is a schematic representation of a second example of an embodiment of an flow measuring device of the invention in a longitudinal section, which extends transversely to the bluff body.

The example of an embodiment shown in FIG. 2 for a flow measuring device 101 of the invention operating on the vortex counter principle includes a measuring tube 102, in which a bluff body 102 is arranged, which extends especially symmetrically to a symmetry plane, in which the longitudinal axis of the measuring tube extends. The bluff body 104 is connected at its two ends with the measuring tube 102. Bluff body 104 serves in measurement operation to bring about in a medium flowing in the measuring tube a Karman vortex street with flow dependent vortex frequency.

The flow measuring device 101 of the invention includes first and second pressure fluctuation measuring arrangements 112, 116 for registering pressure fluctuations resulting from the vortex street. The first pressure fluctuation measuring arrangement 112 includes a paddle, which is arranged symmetrically relative to the aforementioned symmetry plane and is deflectable perpendicular to this symmetry plane by means of the vortices, as indicated by the double arrow in the view. The second pressure fluctuation measuring arrangement 116 likewise includes a paddle, which is arranged symmetrically relative to the aforementioned symmetry plane and is deflectable perpendicular to this symmetry plane by means of the vortices, as indicated by the double arrow in the view. The two pressure fluctuation measuring arrangements 112, 116 include, in each case, an electrical transducer, especially a differential capacitive transducer, a piezoelectric transducer, an inductive transducer or a resistive transducer, for transducing the deflections of a paddle into an electrical signal.

The flow measuring device of the invention further includes an operating- and evaluating unit 120 for evaluating the signals of the pressure fluctuation measuring arrangements 112, 116. Operating- and evaluating unit 120 includes first and second preamplifiers 122, 124, which, in each case, condition the primary signals of an electrical transducer of one of the two pressure fluctuation measuring arrangements. Operating- and evaluating unit 120 further includes a signal processor 126, which is connected to the outputs of the preamplifiers 122, 124 and adapted to determine the shedding frequency f of the vortices based on the time curve of at least one of the output signals of the preamplifiers. Furthermore, the signal processor is adapted to determine the amplitudes of the output signals and to calculate therefrom an amplitude quotient of the amplitudes $A_2/A_1$ of the difference signals of the first and second pressure fluctuation measuring arrangements.

Operating- and evaluating unit 120 is further adapted, based on the amplitude quotient, to ascertain a current value for the Reynolds number, on the basis of which the Strouhal number is determined, with whose help then a flow velocity and a volume flow rate Vdot are calculated based on the shedding frequency f of the vortices.

Details for ascertaining the Strouhal number based on the amplitude ratio are explained below based on FIGS. 3a to 3c.

In the case of need, the kinematic viscosity ν can additionally be calculated based on the volume flow rate Vdot and the Reynolds number Re using $$\nu = (4V\text{dot})/(\pi Re\ d)$$

and output in addition to the measured value of flow as supplemental information, wherein d is the tube diameter.

An underpinning principle of the invention will now be explained based on FIGS. 3a to 3c. FIG. 3a shows relationships between the Reynolds number and the quotient of the amplitudes of the signals of two pressure fluctuation sensors as a function of their positions.

Figure 3A:
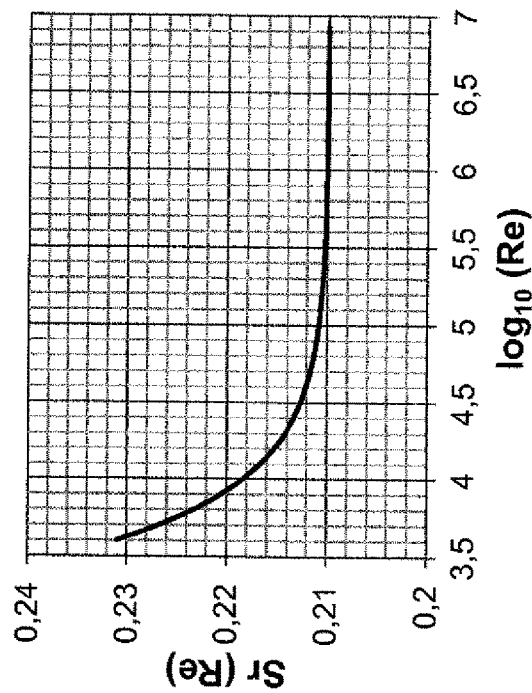
FIG. 3a are examples of data of Reynolds number dependent, amplitude ratios between the signals of pressure fluctuations of measuring arrangements for different positions of the measuring arrangements.
Figure 3B:
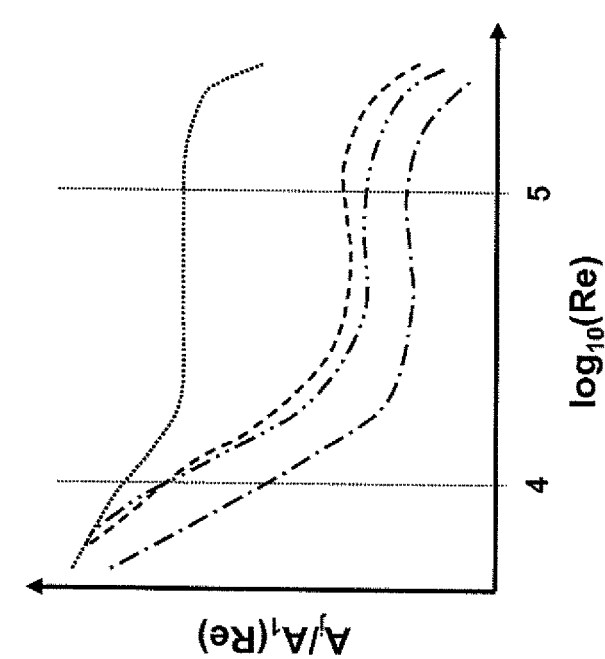

Over a large range of Reynolds numbers, pressure fluctuations were ascertained at the locations of the plurality of pressure fluctuation sensors staggered in the measuring tube for the experimental flow measuring device 201 shown in FIG. 3b. Then, in each case, the amplitude of the signal of one of the pressure fluctuation sensors (S2, S3, S4, S5) arranged in the measuring tube 202 and spaced from a bluff body 204 was divided by the amplitude of the signal of a pressure fluctuation sensor S1 near the bluff body 204. The resulting quotient is shown in FIG. 3a as a function of Reynolds number for the different pressure fluctuation sensors (S2, S3, S4, S5), wherein the line type for representation of the amplitude ratio in FIG. 3a corresponds to the line type for representation of the sensor position in FIG. 3b.

The operating and evaluating unit of a measuring device of the invention contains a function corresponding to the inverse function of one of the functions illustrated in FIG. 3a, in order to ascertain a current value for the Reynolds number Re based on the amplitude ratio of the signals of its pressure fluctuation sensors ascertained in measurement operation.

Via the Reynolds number, finally, the Strouhal number can be ascertained, which enters into the proportionality factor for ascertaining the flow velocity based on the vortex frequency. FIG. 3c shows, schematically, the relationship between the Strouhal number and the Reynolds number for flow measuring devices operating on the vortex counter principle.

For a concrete example of an embodiment of a flow measuring device of the invention, the Strouhal number can, of course, be specifically ascertained as a function of Reynolds number, and the ascertained relationship implemented in the operating- and evaluation unit. Fundamentally, the ascertained relationship should, however, have a curve similar to that shown in FIG. 3c.

The invention claimed is:

1. A flow measuring device operating on the vortex counter principle, comprising:
   a measuring tube for conveying a fluid in the longitudinal direction of said measuring tube;
   a blockage in the form of a bluff body, which is arranged in said measuring tube, said bluff body serves to bring about a Karman vortex street with a flow dependent vortex frequency, when a fluid is flowing through said measuring tube;
   a first pressure fluctuation measuring arrangement for registering pressure fluctuations brought about by the vortex street and for providing signals dependent on pressure fluctuations; and a second pressure measuring arrangement for registering pressure fluctuations brought about by the vortex street and for providing signals dependent on pressure fluctuations;

said first pressure fluctuation measuring arrangement is spaced in the longitudinal direction of said measuring tube from said second pressure fluctuation measuring arrangement;

an evaluating unit, which is adapted, based on the signals of at least one of the pressure fluctuation measuring arrangements, to determine a vortex frequency and as a function of vortex frequency a measured value of flow, wherein:

said evaluation unit is further adapted, based on the ratio of the amplitudes of the signals of first pressure fluctuation measuring arrangement and said second pressure fluctuation measuring arrangement, or variables derived therefrom, to determine the current Reynolds number and/or the kinematic viscosity of the medium flowing in said measuring tube.

2. The flow measuring device as claimed in claim 1, wherein:

said evaluating unit is adapted to determine the measured value of flow taking into consideration the ascertained Reynolds number.

3. The flow measuring device as claimed in claim 1, wherein:

at least one of said pressure fluctuation measuring arrangements includes a paddle sensor.

4. The flow measuring device as claimed in claim 1, wherein:

at least one of said pressure fluctuation measuring arrangements includes at least one pressure sensor in a measuring tube wall and/or in said bluff body.

5. The flow measuring device as claimed in claim 1, wherein:

at least one of said pressure fluctuation measuring arrangements includes a first pressure difference measuring arrangement, with a first pressure sensor and a second pressure sensor, for registering pressure differences, which are brought about by the vortex street, and for providing pressure difference dependent signals.

6. The flow measuring device as claimed in claim 5, wherein:

said second pressure fluctuation measuring arrangement includes a third pressure sensor and a fourth pressure sensor for registering pressure differences, which are brought about by the vortex street, and for providing pressure difference dependent signals.

7. The flow measuring device as claimed in claim 1, wherein:

said bluff body has perpendicular to the longitudinal direction a width b, wherein said first pressure fluctuation measuring arrangement is spaced in the longitudinal direction of said measuring tube not less than one width b, especially not less than two widths b, preferably not less than 3 widths b, from said second pressure fluctuation measuring arrangement.

8. A method for the determining at least one physical parameter of a fluid by means of a flow measuring device operating on the vortex counter principle, wherein the flow measuring device includes: a measuring tube for conveying a fluid in the longitudinal direction of the measuring tube; a blockage in the form of a bluff body, which is arranged in the measuring tube, wherein the bluff body serves to bring about a Karman vortex street with a flow dependent vortex frequency, when a fluid is flowing through the measuring tube; a first pressure fluctuation measuring arrangement for registering pressure fluctuations brought about by the vortex street and for providing signals dependent on pressure fluctuations; a second pressure measuring arrangement for registering pressure fluctuations brought about by the vortex street and for providing signals dependent on pressure fluctuations; wherein the first pressure fluctuation measuring arrangement is spaced in the longitudinal direction of the measuring tube from the second pressure fluctuation measuring arrangement;

wherein the method comprises steps as follows:

permitting a fluid to flow through the measuring tube;

registering by means of the first pressure fluctuation measuring arrangement pressure fluctuations, which are brought about by the vortex street of the flowing fluid;

registering by means of the second pressure fluctuation measuring arrangement pressure fluctuations, which are brought about by the vortex street of the flowing fluid; and determining a current value of the Reynolds number and/or of the kinematic viscosity of the fluid based on the ratio of the amplitudes of the signals of the first pressure fluctuation measuring arrangement and the second pressure fluctuation measuring arrangement, or variables derived therefrom.

9. The method as claimed in claim 8, comprising the steps of:

determining a value of the Reynolds number of the fluid based on the ratio of the amplitudes of the signals of the first pressure fluctuation measuring arrangement and the second pressure fluctuation measuring arrangement;

determining a value of the frequency of at least one of the signals of the pressure fluctuation measuring arrangement; and determining a flow measured value as a function of the value of the frequency taking into consideration the value of the Reynolds number.

* * * * *